(No Model.)

W. A. MORRIS.
CAR FENDER.

No. 536,475. Patented Mar. 26, 1895.

WITNESSES:

INVENTOR
W. A. Morris
BY
ATTORNEYS.

UNITED STATES PATENT OFFICE.

WILLIAM A. MORRIS, OF BROOKLYN, NEW YORK, ASSIGNOR TO HIMSELF AND ROSWELL W. KEENE, OF SAME PLACE.

CAR-FENDER.

SPECIFICATION forming part of Letters Patent No. 536,475, dated March 26, 1895.

Application filed November 3, 1894. Serial No. 528,227. (No model.)

*To all whom it may concern:*

Be it known that I, WILLIAM A. MORRIS, a citizen of the United States, residing at Brooklyn, in the county of Kings and State of New York, have invented a new and Improved Car-Fender, of which the following is a full, clear, and exact description.

The object of the invention is to provide a new and improved car fender, arranged in such a manner as to readily and safely pick up human beings in front of a car, and to automatically move to a safety position on coming in contact with solid inanimate obstructions on the track.

The invention consists principally of a slidable fender or platform on the car.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1:
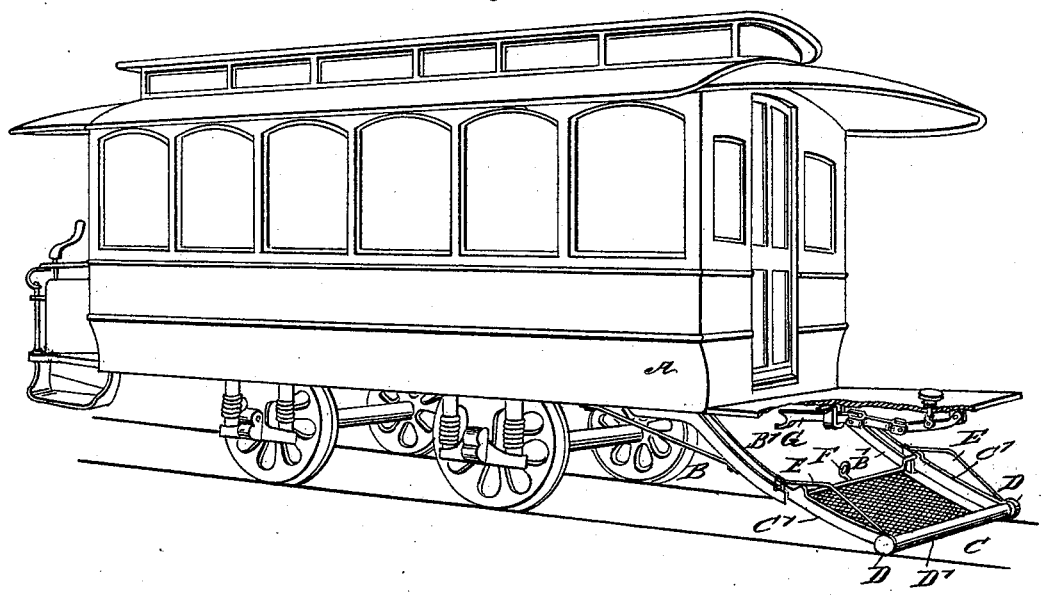
Figure 2:
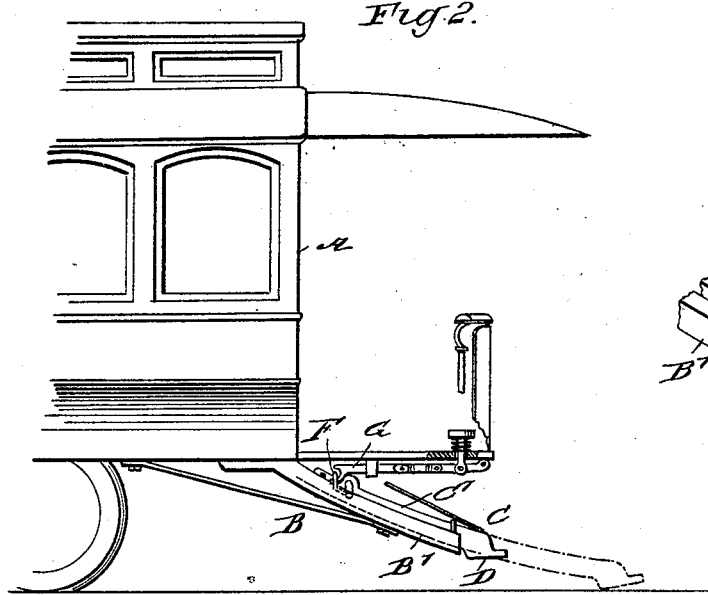
Figure 3:
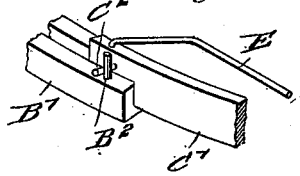

Figure 1 is a perspective view of the improvement as applied, part of the car being broken away. Fig. 2 is a side elevation of the same with part in section; and Fig. 3 is an enlarged perspective view of the stop for the platform.

On the car A, and under each platform thereof, is secured a frame B, provided with forwardly and downwardly extending guideways B', preferably slightly curved, as indicated in the drawings, and having a central longitudinal groove adapted to receive the side bars C' of a fender or platform C, provided at its front end with wheels or shoes D, adapted to travel on the track rails over which the car passes. A roller D' is journaled on the axle for the two wheels D, as indicated in Fig. 1.

The fender is preferably provided with a suitable netting adapted to receive a human being, or other object struck by the car and picked up, to support the same until the car is brought to a standstill. The side bars C' are provided with a suitable railing E, to prevent a person from accidentally falling off the fender after being picked up. The upper portion of the railing E is bent at an angle to its lower part and extends substantially parallel to the under side of the car floor. On the inner end of the fender or platform C is secured an eye F, adapted to connect with a bolt G held to slide on the car and under the control of the operator by a suitable device as shown, for disengaging the said bolt from the eye whenever desired. This device consists of a lever pivoted at its forward end to the under side of the car platform and provided with a stud pivoted thereto at its central part and extending up through an aperture in the platform. The upper end of said stud is headed and a spiral spring is held between the head thereof and the platform whereby said lever is normally upheld. The rear end of the lever is connected by means of a pivoted link to the forward end of the bolt or hook bar G which is arranged to slide in a bracket or guide on the under side of the platform.

In order to limit the downward sliding motion of the platform C, I provide the side bars C' thereof with transversely-extending pins $C^2$ adapted to abut on vertical pins $B^2$ fastened on the guideways B', as plainly shown in Fig. 2. Now it will be seen that the fender or platform C slides down the guideways B' until the wheels D rest and travel on the track rails, the downward sliding motion being limited by the stop pins $C^2$ and $B^2$ above described and shown in detail in Fig. 3. When the platform is in this position it can readily pick up a human being who has fallen on the track in front of the car. In case the roller D' strikes a solid inanimate obstruction on the track, then the platform C will readily slide upward on its guideways B', so as to permit the platform to readily pass over the obstruction without being damaged.

When it is not desired to use the platform it is slid upward on its guideways until the eye F engages the bolt G, so as to hold the platform in an uppermost position. The eye F will also be engaged with the bolt G in case the platform C is forced into an uppermost position by a solid obstruction, and when the latter has been passed, the operator can disengage the bolt G from the eye F, to again permit the platform to slide downward.

Having thus fully described my invention, I claim as new and desire to secure by Letters Patent—

1. In a car fender, the combination of guides secured at their rear ends to the under side of the car floor, said guides having their forward ends inclined downward toward the track-rails and being grooved in their upper faces, a fender having side bars the lower portions of which fit and slide in the grooves in the guides, means for holding the fender in its upper position, and stops on the forward ends of the guides to engage the fender and hold the same when in its lowered position, substantially as set forth.

2. In a car fender the combination of a fender movably mounted under the car, a bar slidingly mounted under the car and provided with a hook adapted to engage the rear part of the fender and hold the same in its elevated position, a lever pivoted at one end to the car, a link pivotally connected at one end to the lever and at the other end to said sliding bar, a projection pivoted to said lever and extending through the car floor, and a spring for holding said parts in operative position, substantially as set forth.

WILLIAM A. MORRIS.

Witnesses:
 THEO. G. HOSTER,
 JNO. M. RITTER.